Sept. 4, 1923.

D. F. HOLMAN 1,466,718

CONDUIT PROTECTION MEANS

Filed Dec. 14, 1922

Inventor,
Daniel F. Holman,
By Howard S. Smith,
His Attorney

Patented Sept. 4, 1923.

1,466,718

UNITED STATES PATENT OFFICE.

DANIEL F. HOLMAN, OF FARMERSVILLE, OHIO.

CONDUIT-PROTECTION MEANS.

Application filed December 14, 1922. Serial No. 606,800.

*To all whom it may concern:*

Be it known that I, DANIEL F. HOLMAN, a citizen of the United States, residing at Farmersville, in the county of Montgomery and State of Ohio, have invented certain new and useful Improvements in Conduit-Protection Means, of which the following is a specification.

This invention relates to new and useful improvements in conduit protection means such as the appliance disclosed in my United States Letters Patent No. 1,327,278 granted January 6th, 1920, and has particular reference to a protective device which may be readily installed in a cylindrical tile, pipe of other liquid conduit.

The principal object of my invention is to provide a simple, economical and efficient appliance that my be easily installed in a liquid conduit such as a drain, sewer or culvert to prevent the entrance into, or through, it of animals such as muskrats, skunks, rats, rabbits and dogs.

Figure 1:
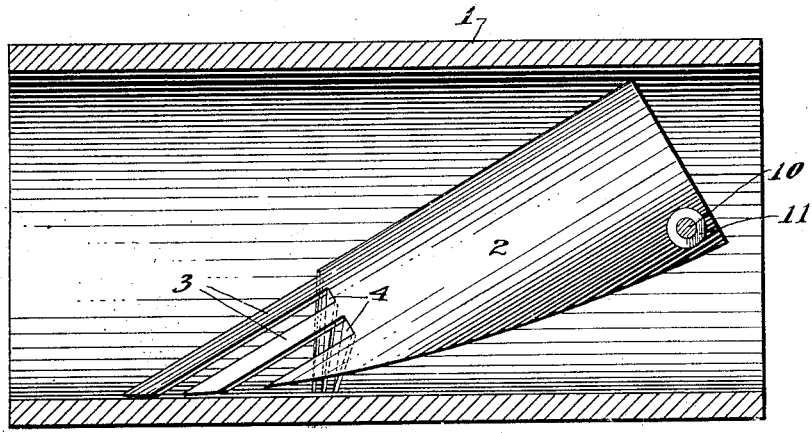
Figure 2:
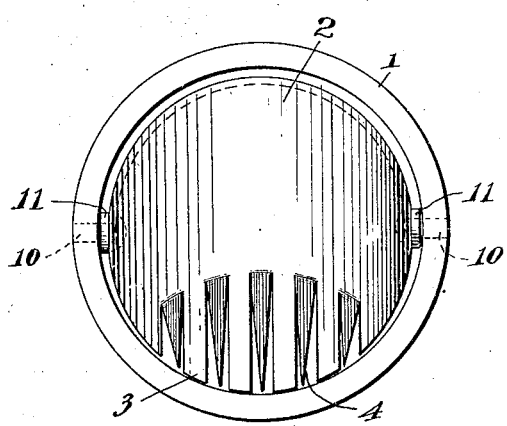

It is another object of my invention to provide a scoop-shaped metal gate that will conform to the contour of the cylindrical conduit in which it is installed and thereby form an effective barrier to the passage of animals therethrough.
It is still a further object of my invention to provide simple and economical hinged means for so attaching the metal gate to the wall of the conduit that it may have a free swinging movement therein.
One convenient form of embodiment of my invention is illustrated in the accompanying drawings, of which Figure 1 is a side elevational view, partly in section, of a tile and my protective device, showing how the latter is hingedly secured in the tile by side bolts. And Figure 2 is an end view of the same.

Throughout the specification and drawings, similar reference characters denote corresponding parts.

In a detailed description of the form of embodiment of my invention illustrated in the accompanying drawings, the numeral 1 designates a cylindrical tile or other conduit in which there is swingingly mounted, preferably near its outlet end, a scoop-shaped gate 2. The latter may be either cast or stamped from suitable metal in the form of a scoop to conform to the contour of the tile, and having a series of integral prongs 3 formed on its front end. Turned down from the under side of the gate between the prongs 3 and a short distance from their front ends, are spurs 4 which form a secondary barrier to the entrance of such small animals as rats, into cellars of buildings. (See Figures 1 and 2).

For the purpose of hingedly securing the rear portion of the gate 2 to the inside surface of the cylindrical conduit 1, I have provided the following hinge structure. Passing through the tile wall are oppositely-disposed bolts 3, 3, each of which projects through a rear side edge of the gate 2. A washer 4 is provided on each bolt between the gate and the tile to enforce the necessary clearance between them.

These side bolts and washers connect the gate to the conduit in such a manner that the gate may have a free and uniform swinging movement in the latter. They also form connecting means which firmly brace the gate against any side force that may be exerted by a large animal in its endeavor to work its way past the gate from the side.

In Figures 1 and 2 I have shown the gate 2 as being hingedly connected to the tile wall by side bolts 10, 10. Each of the latter passes through a respective rear side edge of the gate and through the tile wall, with a washer 11 being provided on each bolt between the gate and the tile to enforce the necessary clearance between them.

The slotted lower end of the gate 2 normally rests upon the bottom of the conduit, and is not raised or floated by the ordinary flow of water through the latter.

It will thus be seen that I have provided an appliance which is particularly adapted for easy installation in cylindrical tiles, pipes, culverts and other conduits to prevent the entrance of animals in and through the latter. It is simple and economical in construction, and may be readily installed in any form of cylindrical conduit.

I do not wish to be limited to the details of construction and arrangement herein shown and described, and any changes or modifications may be made therein within the scope of the subjoined claims.

Having described my invention, I claim:

1. In a cylindrical conduit, the combination with a gate therein whose periphery conforms to the contour of the conduit and which terminates at its front end in prongs which rest upon the bottom of the conduit, and a bolt passing through each rear side edge of the gate and the conduit wall for hingedly securing the former to the latter.

2. In a cylindrical conduit, the combination with a scoop-shaped gate therein terminating at its front end in projections which rest upon the bottom of the conduit, spurs turned downwardly from said gate between, and a short distance from the front ends of, said projections, a bolt passing through each rear side edge of the gate and the conduit wall, and a washer on each bolt between said gate and the conduit for the purpose specified.

In testimony whereof I have hereunto set my hand this 13th day of December, 1922.

DANIEL F. HOLMAN.

Witness:
HOWARD S. SMITH.